United States Patent [19]

Ishida

[11] Patent Number: 4,733,641

[45] Date of Patent: Mar. 29, 1988

[54] DIRECT INJECTION TYPE DIESEL ENGINE

[75] Inventor: Shiro Ishida, Fujisawa, Japan

[73] Assignee: Isuzu Motors Limited, Tokyo, Japan

[21] Appl. No.: 893,501

[22] Filed: Aug. 5, 1986

[30] Foreign Application Priority Data

Aug. 13, 1985 [JP] Japan ................................. 60-176933

[51] Int. Cl.$^4$ ............................................. F02B 3/06
[52] U.S. Cl. .................................... 123/276; 123/263;
                                        123/299; 123/301; 239/533.4
[58] Field of Search ............... 123/263, 276, 279, 299,
         123/300, 301, 445, 446; 239/533.2, 533.3, 533.4,
         533.5, 533.6, 533.7, 533.8, 533.9, 533.11, 533.12

[56] References Cited

U.S. PATENT DOCUMENTS

| | | | |
|---|---|---|---|
| 2,305,801 | 12/1942 | Weibicke | 123/276 X |
| 3,559,892 | 2/1971 | De Luca | 239/533.4 |
| 4,080,937 | 3/1978 | Wolters | 123/276 X |
| 4,382,554 | 5/1983 | Hofmann | 239/533.9 |
| 4,528,951 | 7/1985 | Yamada | 239/533.4 X |
| 4,546,739 | 10/1985 | Nakajima et al. | 123/299 |

FOREIGN PATENT DOCUMENTS 1216611  5/1966  Fed. Rep. of Germany ...... 123/276
2074234 10/1981  United Kingdom ............. 239/533.9

Primary Examiner—Willis R. Wolfe, Jr.
Attorney, Agent, or Firm—Cullen, Sloman, Cantor, Grauer, Scott & Rutherford

[57] ABSTRACT

A direct injection type Diesel engine comprising a combustion chamber having an inner wall surface formed at a piston head of a piston reciprocated in a cylinder of the Diesel engine, and a fuel injection nozzle means mounted to a cylinder head of the Diesel engine, said fuel injection nozzle means having a main nozzle hole and an auxiliary nozzle hole, wherein the main nozzle hole is closed under low load of the Diesel engine to allow fuel to be injected from the auxiliary nozzle hole only. A part of the fuel injected from the auxiliary nozzle hole is allowed to collide with the inner wall surface of the combustion chamber arranged adjacent thereto, or is allowed to collide with an inner wall surface of a passage formed at the cylinder head, which inner wall surface is connected to the inner wall surface of the combustion chamber, thereby to be atomized, while a residual part of the fuel is allowed to flow along the inner wall surface of the combustion chamber. Thus, premature ignition and slow combustion may be attained.

5 Claims, 5 Drawing Figures

DIRECT INJECTION TYPE DIESEL ENGINE

DETAILED DESCRIPTION OF THE INVENTION

1. Field of the Invention

The present invention relates to a direct injection type Diesel engine, and more particularly to a direct injection type Diesel engine which reduces noise, HC (hydrocarbon) and blue-white smoke

2. Prior Art

The direct injection type Diesel engine has the advantages such high combustion efficiency and low exhaust temperature, but on the other hand, it has the disadvantages of high explosion pressure, and high vibration and noise.

There is known a direct injection type Diesel engine employing a M-type (Mann-type) combustion chamber. The M-type combustion chamber is constructed in the following manner. Fuel injected from a fuel injection nozzle is deposited onto an inner wall surface of the combustion chamber to form a fuel film on the inner wall surface. The fuel film is heated by heat of the atmosphere in the combustion chamber and the inner wall to create a fuel vapor. The fuel vapor is mixed with suction air to form an air-fuel mixture for combustion and to cause self-ignition.

In the direct injection type Diesel engine employing the M-type combustion chamber, the fuel vapor sequentially vaporized from the inner wall of the combustion chamber is provided for combustion to slow the combustion and suppress rapid increase in pressure. Therefore, noise and vibration are relatively reduced. However, ignition lag is easily generated, and causes explosive combustion. Furthermore, performance in terms of HC and blue-white smoke deteriorates. This problem occurs under low load and at low temperature in particular.

Further, there is known another direct injection type Diesel engine employing a Pintaux nozzle for preliminary injection. In this case, a preliminary injecting fuel (auxiliary spray fuel) is injected to the center of the combustion chamber in such a manner as to be drawn by swirl S, thereby accelerating creation of an air-fuel mixture and improving ignitability and performance in HC and blue-white smoke. However, as the creation of the air-fuel mixture is instantaneously attained, combustion results quickly. As a result, the rate of increase in pressure becomes is high thereby causing a large amount of noise and vibration.

SUMMARY OF THE INVENTION

The present invention is intended to overcome the aforementioned problems. It is an object of the present invention to provide a direct injection type Diesel engine which reduces the noise and decreases HC and blue-white smoke.

According to one aspect of the present invention, the direct injection type Diesel engine comprises a combustion chamber having an inner wall surface formed at a piston head of a piston reciprocated in a cylinder of the Diesel engine, and a fuel injection nozzle means mounted to a cylinder head of the Diesel engine, said fuel injection nozzle means having a main nozzle hole exposed to the combustion chamber and an auxiliary nozzle hole offset from the center of the combustion chamber and exposed to the inner wall surface of the combustion chamber at a position adjacent to a side portion of the combustion chamber, wherein the main nozzle hole is closed under low load of the Diesel engine to allow fuel to be injected from the auxiliary nozzle hole is allowed to collide with the inner wall surface of the combustion chamber and is atomized, while a residual part of the fuel is allowed to flow along the inner wall surface of the combustion chamber, thereby achieving premature ignition and slow combustion.

According to another aspect of the present invention, the direct injection type Diesel engine comprises a combustion chamber having an inner wall surface formed at a piston head of a piston reciprocated in a cylinder of the Diesel engine, and a passage formed at a cylinder head of the Diesel engine and communicating with the cylinder, said passage having an inner wall surface connected to the inner wall surface of the combustion chamber, and a fuel injection nozzle means provided in the passage, said fuel injection nozzle means having a mian nozzle hole exposed to the combustion chamber and an auxiliary nozzle hole exposed to the inner wall surface of the passage, wherein the main nozzle hole is closed under low load of the Diesel engine to allow fuel to be injected from the auxiliary nozzle hole only. The inner wall surface of the passage is formed between the fuel injection nozzle means and the inner wall surface of the combustion chamber. A part of the fuel injected from the auxiliary nozzle hole is allowed to collide with the inner wall surface of the passage and is atomized, while a residual part of the fuel is allowed to flow from the inner wall surface of the passage along the inner wall surface of the combustion chamber, thereby achieving premature ignition and slow combustion.

PREFERRED EMBODIMENTS OF THE INVENTION

Now, there will be described in detail a preferred embodiment of the present invention with reference to the accompanying drawings.

Figure 1:
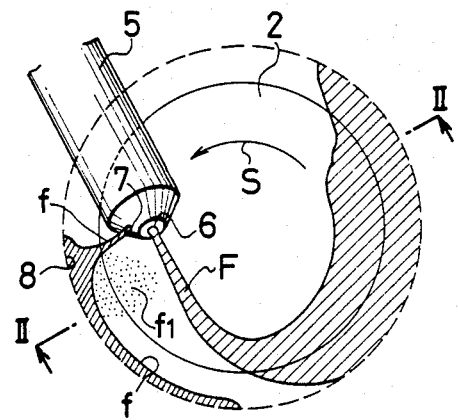
FIG. 1 is a plan view of a preferred embodiment of the present invention.
Figure 2:
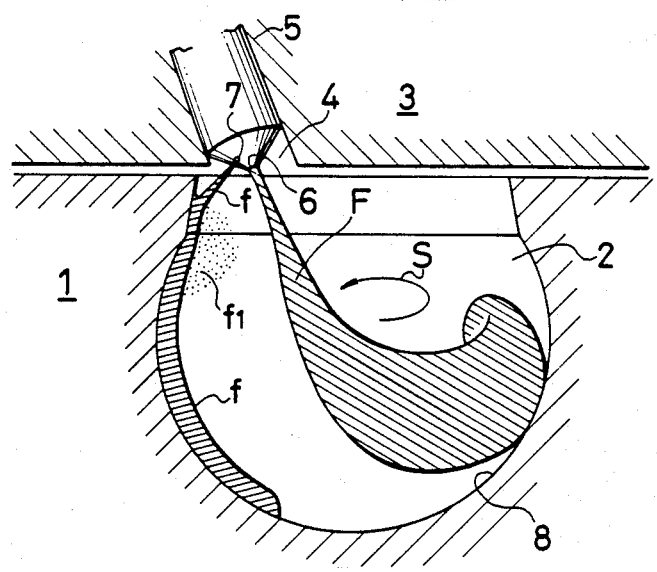
FIG. 2 is a sectional view taken along the line II—II in FIG. 1.

As shown in FIGS. 1 and 2, a piston head 1 of a piston adapted to be reciprocated in a cylinder of a Diesel engine is formed with a ball-like combustion chamber 2 having an inner wall surface 8. On the other hand, a cylinder head 3 of the Diesel engine is formed with a fuel injection nozzle means mounting passage 4 communicating with the cylinder at a position offset from the center of the combustion chamber 2. A fuel injection nozzle means 5 is provided in the passage 4 in a manner such as to be exposed to the combustion chamber 2 at the position offset from the center of the combustion chamber 2.

The fuel injection nozzle means 5 is of a type similar to a Pintaux nozzle. The fuel injection nozzle means 5 is formed with a main nozzle hole 6 for main injection at a center thereof, and is also formed with an auxiliary nozzle hole 7 for auxiliary injection at a side conical portion of the nozzle means. The auxiliary nozzle hole 7 is adapted to be opened and inject an auxiliary spray fuel when the amount of lift of a needle valve (not shown) is less than a predetermined value under low load, for example, and the main nozzle hole 6 is closed. On the other hand, the main nozzle hole 6 is adapted to be opened and inject a main spray fuel predominantly over the auxiliary nozzle hole 7 when the amount of lift of the needle valve is more than the predetermined value under high load, for example. In particular, an aperture of the auxiliary nozzle hole 7 is designed to be small, so as to atomize the auxiliary spray fuel.

As the fuel injection nozzle means 5 is offset from the center of the combustion chamber 2, the auxiliary nozzle hole 7 may be exposed oppositely to the inner wall surface 8 of the combustion chamber which surface is arranged adjacent to the hole 7 at a short distance. On the other hand, the main nozzle hole 6 may be exposed to the inner wall surface 8 of the combustion chamber 2 on a downstream side of swirl S created in the combustion chamber 2 at a relatively long distance from the wall surface 8.

In operation, the amount of fuel to be injected is small under low load such as at idling. Therefore, the amount of lift of the needle valve may be made small, and accordingly an auxiliary spray fuel f is injected from the auxiliary nozzle hole 7 only. The auxiliary spray fuel f injected collides with the inner wall surface 8 of the combustion chamber, and a part $f_1$ of the fuel is atomized by the power of such collision. Then, the atomized fuel is inwardly scattered in the combustion chamber 2, and is converted into an air-fuel mixture by the swirl S created in the combustion chamber 2 to contribute to ignition.

Most of residual fuel f is immediately deposited onto the inner wall surface 8 of the combustion engine after collision, and is allowed to flow in the state of film along the swirl S. In other words, premature ignition may be attained with the atomized fuel $f_1$ scattered by the collision against the inner wall surface 8 and mixed with air by the swirl S. Further, combustion after ignition may be slowed by the film-like fuel f flowing along the inner wall surface 8 of the combustion chamber. Thus, ignition lag may be prevented, and the rate of pressure increase in the cylinder may be suppressed to achieve reduction in the noise.

When the fuel is formed into a film and the film-like fuel is allowed to flow in the same direction of a stream of the swirl S, the mixing of fuel with air by the swirl S is suppressed. If vaporization of fuel and mixing of fuel with air are substantially reduced, the amount of HC and blue-white smoke is reduced. In the regard, according to the present invention, the auxiliary spray fuel f is atomized by making the aperture small, and the fuel film is made thin. As a result, vaporization of the fuel by heat in the atmosphere in the combustion chamber and from the inner wall of the combustion chamber may be accelerated. Under the accelerated condition, the partial fuel $f_1$ is atomized and scattered to obtain premature ignition. After the premature ignition, a fuel vapor is sufficiently supplied for combustion to attain smooth slow combustion and further decrease HC and blue-white smoke.

Consequently, according to the present invention, a slow combustion process is conducted under the accelerated condition of vaporization and mixing of the film-like fuel with air. Under such a good balance of accelerated vaporization of fuel and slow combustion, rapid increase in pressure is suppressed to reduce the noise and decrease HC and blue-white smoke. Especially, the premature ignition by atomization of partial fuel $f_1$ prevents ignition lag and explosive combustion, and further suppresses creation of HC and blue-white smoke.

Moreover, according to the present invention, the inner wall surface 8 of the combustion chamber is arranged in the vicinity of the auxiliary nozzle hole 7. Accordingly, it is possible to suppress the auxiliary spray fuel f being drawn by the swirl S until the fuel collides with the inner wall surface 8 of the combustion chamber. In this respect also, rapid combustion may be prevented.

On the other hand, under medium and high load, a combustion process similar to that under low load is conducted at the beginning of injection. Especially in this case, the needle valve is lifted highly, and then a main spray fuel F having a large spray penetration is injected from the main nozzle hole 6. Similarly, the main spray fuel F is injected in the same direction of the stream of the swirl S toward the inner wall surface 8 of the combustion chamber 2 on the downstream side of the swirl S, and is deposited in the state of film onto the inner wall surface 8 of the combustion chamber 2 by the energy of the swirl S. Then, the fuel F is vaporized by a flame or the like created by the premature ignition of the auxiliary spray fuel f. Accordingly, it is possible to reduce the noise rather than instantaneously mix the overall fuel with air.

Figure 3:
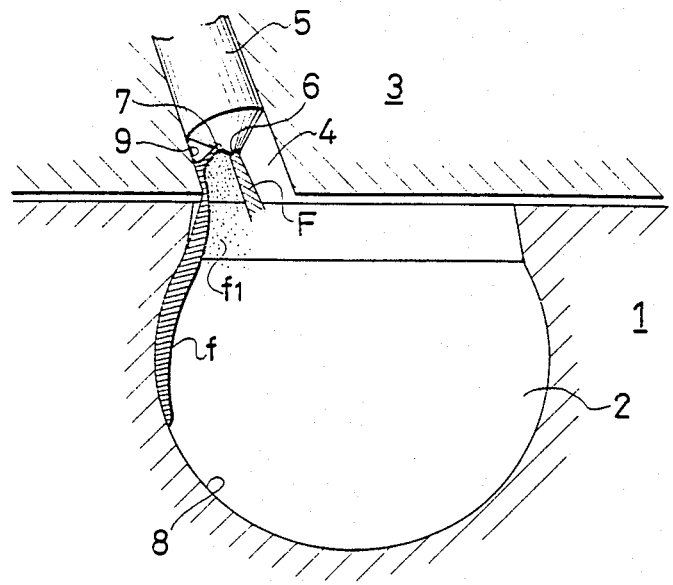
FIG. 3 is a sectional side view of another preferred embodiment of the present invention.
Figure 4:
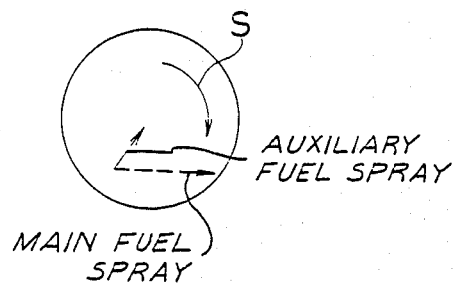
FIG. 4 is a plan view of the prior art.
Figure 5:
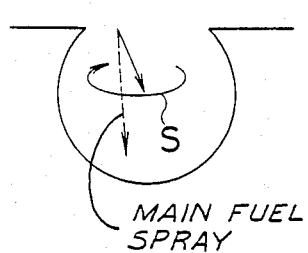
FIG. 5 is a sectional side view of the prior art.

FIG. 3 shows another preferred embodiment of the present invention. According to this preferred embodiment, in substitution for the aforementioned construction wherein the auxiliary nozzle hole 7 is exposed to the inner wall surface 8 of the combustion chamber as arranged adjacent thereto to allow the auxiliary spray fuel f to collide with and be deposited onto the inner wall surface 8 of the combustion chamber, the fuel injection nozzle means mounting passage 4 is formed with an inner wall surface 9 connected to the inner wall surface 8 of the combustion chamber, and the auxiliary nozzle hole 7 is exposed to the inner wall surface 9. The auxiliary spray fuel f is allowed first to collide with the inner wall surface 9, and is then allowed to flow from the passage 4 to the inner wall surface 8 of the combustion chamber. In this case, the auxiliary spray fuel f is prevented from being drawn by the swirl S until it collides with the inner wall surface 8 of the combustion chamber, thereby suppressing the rapid combustion. The main nozzle hole 6 in the preferred embodiment is similar so that in the previous embodiment.

Furthermore, according to the present invention, shortening of ignition lag (assuring of premature ignition) makes it possible to use fuel of a low cetane number to suitably operate the Diesel engine.

EFFECT OF THE INVENTION

As is mentioned above, the superior effects of the present invention are summarized as follows:

(1) Fuel may be satisfactorily burnt by the premature ignition and the slow combustion process to thereby reduce the noise and decrease HC and blue-white smoke.

(2) The auxiliary spray fuel is prevented from being drawn by the swirl until it collides with the inner wall surface to thereby suppress the rapid combustion.

(3) The use of fuel of a low cetane number is made possible to thereby suitably operate the Diesel engine by assuring premature ignition.

What is claimed is:

1. A direct injection type Diesel engine, comprising:

a combustion chamber having an inner wall surface formed at the head of a piston reciprocated in a cylinder of said Diesel engine; and fuel injection nozzle means mounted on a cylinder head of said Diesel engine at a position offset from the center of said combustion chamber, said fuel injection nozzle means being provided with a main nozzle hole for injecting a main fuel spray and an auxiliary nozzle hole for injecting an auxiliary fuel spray, said main nozzle hole being arranged and exposed to said inner wall of said combustion chamber and being directed toward the downstream side of fuel swirl with said chamber with respect to the location of said fuel injection nozzle means, said fuel swirl being generated in said combustion chamber in a manner to let said main fuel spray flow and evaporate on said inner wall surface of said combustion chamber along the stream of said swirl, said auxiliary nozzle hold being arranged and exposed to said inner surface of said combustion chamber at a position adjacent thereto, so as to allow said auxiliary fuel spray to collide with said inner wall surface of said combustion chamber at said position adjacent to said auxiliary nozzle hole, a portion of said auxiliary fuel spray being atomized so as to be scattered toward the inner area of said combustion chamber, while a residual part of said auxiliary fuel spray flows and evaporates along said inner wall surface of said combustion chamber, and wherein said fuel injection nozzle means injects fuel only through said auxiliary nozzle hole while keeping said main nozzle hole closed when said Diesel engine is under low load.

2. The direct injection type Diesel engine according to claim 1, wherein said auxiliary nozzle hole of said fuel injection nozzle means is exposed to said inner wall of said combustion chamber so as to let said auxiliary fuel flow evaporate on said inner wall of said combustion chamber along said stream of said swirl.

3. A direct injection type Diesel engine, comprising:
a combustion chamber having an inner wall surface formed at the head of a piston reciprocated in a cylinder of said Diesel engine;

a passage formed at a cylinder head of said Diesel engine and communicating with said cylinder, said passage having an inner wall surface connected to said inner wall surface of said combustion chamber; and fuel injection nozzle means located in said passage and provided with a main nozzle hole for injecting main fuel spray and an auxiliary nozzle hole for injecting auxiliary fuel spray, the main nozzle hole being exposed to said combustion chamber, the auxiliary nozzle hole being exposed to said inner wall surface of said passage so as to let said auxiliary fuel spray collide with said inner wall of said passage, and to allow a part of said auxiliary fuel spray to be atomized so as to be scattered toward the inner area of said combustion chamber, while the residual part of said auxiliary fuel spray flows and evaporates along said inner wall surface of said combustion chamber through said passage.

4. The direct injection type Diesel engine according to claim 3, wherein said auxiliary nozzle hole of said fuel injection nozzle means is exposed to said inner wall surface of said passage, so as to let said residual part of fuel flow and evaporate on said inner wall surface of said combustion chamber along a stream of fuel swirl generated in said combustion chamber.

5. The direct injection type Diesel engine according to claim 3, wherein said main nozzle hole of said fuel injection nozzle means is located in said passage, exposed to said inner wall surface of said combustion chamber, and directed toward the downstream side of said swirl with respect to the location of said fuel injection nozzle means, so as to inject said main spray fuel therefrom and to let said main spray fuel flow and evaporate on said inner wall surface of said combustion chamber long said stream of said swirl.

* * * * *